Figures 1, 2:
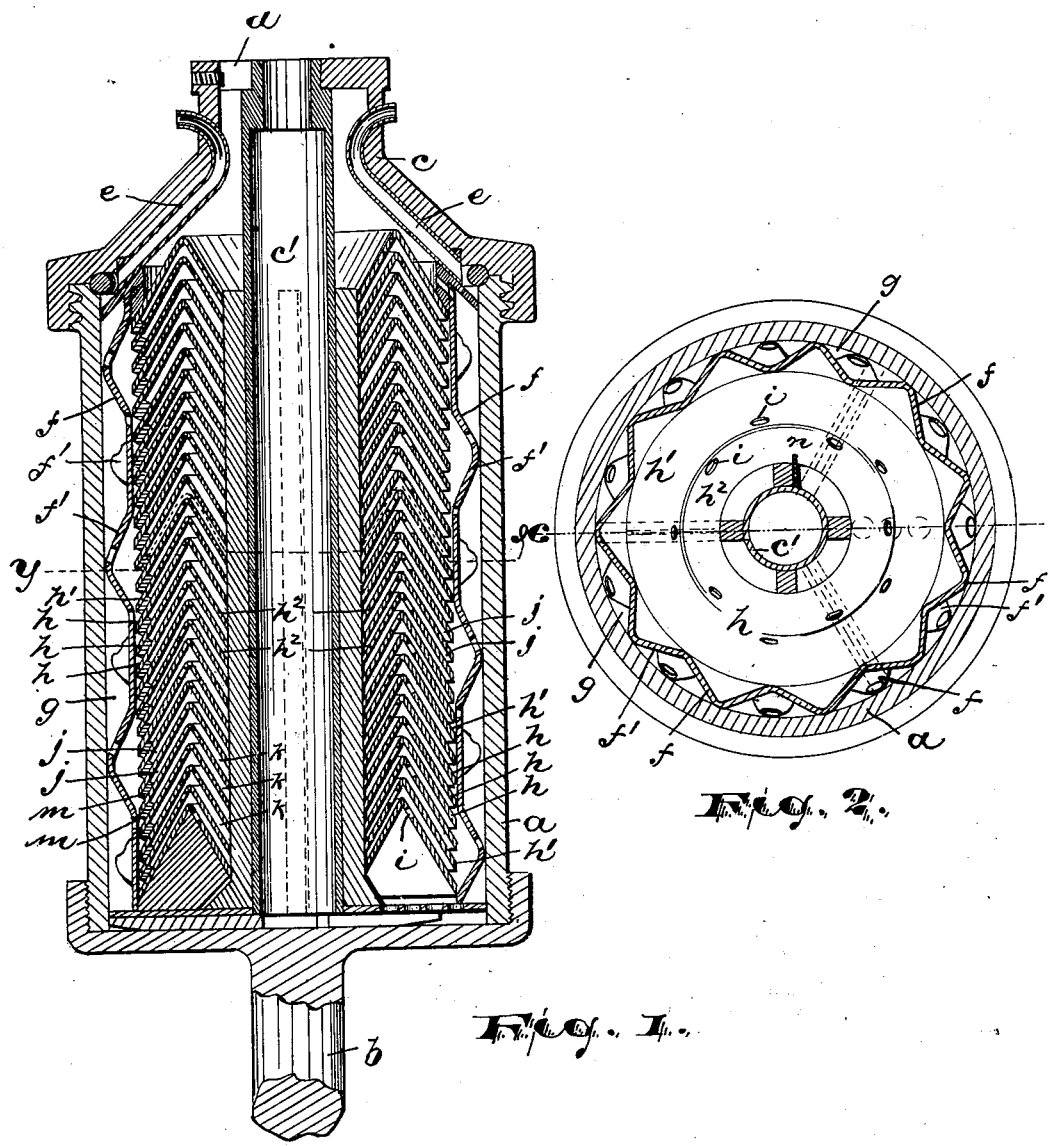

No. 727,052. PATENTED MAY 5, 1903.
O. ANDERSON.
CENTRIFUGAL SEPARATOR.
APPLICATION FILED DEC. 20, 1900.

NO MODEL.

WITNESSES:
Henry Krug
Russell M. Everett

INVENTOR:
Oscar Anderson,
BY
Drake & Co.
ATTORNEYS.

No. 727,052.

Patented May 5, 1903.

UNITED STATES PATENT OFFICE.

OSCAR ANDERSON, OF KEARNEY, NEW JERSEY, ASSIGNOR TO NATIONAL DAIRY MACHINE COMPANY, A CORPORATION OF NEW JERSEY.

CENTRIFUGAL SEPARATOR.

SPECIFICATION forming part of Letters Patent No. 727,052, dated May 5, 1903.

Application filed December 20, 1900. Serial No. 40,494. (No model.)

*To all whom it may concern:*

Be it known that I, OSCAR ANDERSON, a citizen of the United States, residing at Kearney, in the county of Hudson and State of New Jersey, have invented certain new and useful Improvements in Centrifugal Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of centrifugal separators in which is employed a cylinder having protuberances such as shown in my patent dated February 16, 1897, and numbered 576,994.

The objects of the present improvements are to secure a more perfect separation of the cream when the milk is passed through the separating devices at a high rate of speed, whereby the qualitative and quantitative capacities of the separator are increased.

A further object is to enable a bowl of small diameter and such as can be rotated at a high rate of speed without an undue expense of power to effectively separate the cream at a rapid rate of flowage through the creaming devices, and thus effect a saving of power, and to secure other advantages and results, some of which may be referred to hereinafter in connection with the description of the working parts.

The invention consists in the improved centrifugal separator and in the arrangements and combinations of parts of the same, all substantially as will be hereinafter set forth and finally embraced in the clauses of the claim.

Referring to the accompanying drawings, in which like letters of reference indicate corresponding parts in both figures, Figure 1 is a central vertical section of the improved separator, taken at line $x$ of Fig. 2; and Fig. 2 is a section of the same, taken at line $y$, Fig. 1.

In said drawings, $a$ indicates a suitable bowl secured upon a vertical rotary shaft $b$ and provided with a removable cover $c$ in any ordinary and suitable manner, the said cover being provided with an exit $d$ for the cream and outlets $e$ $e$ for the blue milk. At the center of the cover the same is perforated and provided with a central milk-feed tube $c'$, which extends from the central perforation in the cover downward near to the bottom of the bowl. Within the said bowl the same is provided with a liner to facilitate the separation of the cream from the blue milk. At the outer part of the chamber within said bowl and engaging the inner side walls thereof is arranged a cylindrical creaming-partition $f$, substantially such as shown in my prior patent, above referred to. Said partition is provided with conical perforated protuberances $f'$, formed by pressing out the tin or sheet metal of which the partition is constructed by means of suitable dies, a large number of such protuberances being formed which intersect or project across the vertical passage $g$, formed at or near the periphery of the bowl between said cylindrical partition and the inside walls of the bowl, so that the milk as it flows upward in said passage $g$ is frequently interrupted in its course by said protuberances and the particles of butter-fat in the blue milk are effectively brought into contact with the projecting inclined surfaces of said protuberances. Said inclined surfaces of the protuberances at the beginning of the separating operation immediately gather or receive a thin film-like coating of cream, by means of which the small cream particles remaining in the blue milk as it flows upward are entrapped or caused to adhere by affinity with greater certainty and the particles agglomerate with those already on said surfaces, and under the high centrifugal force exerted thereon the accumulation of cream flows over said surfaces inward toward the cream-wall, thus very thoroughly removing even the fine cream particles from the said blue milk. Within said cylinder $f$, having the pressed-out and perforated protuberances and bearing against the inner walls of the same, is arranged a vertical series of sheet-metal annular plates or rings $h$ $h$ $h$, which are annularly bent or corrugated, the summit or angle of the protuberance or projection lying, preferably, concentric with the axis of the plate. The protuberance on one side corresponds with the cavity on the opposite side, and the plates may thus be nested, the protuberances or projection of one annular plate or ring entering the cavity of the next in order, as shown. I prefer to construct the protuberances so they form a continuous circle at the summit or angle and so that the flange-like sides extend continuously at opposite inclinations from said summit to the outer partition, inasmuch as by this construction I secure a greater amount of surface, in practice, cutting the lines of centrifugal force, than I would were the horizontal plates composed of a series or plurality of corrugations, it being understood that in corrugating the metal the angle is usually rounded to prevent rupture, and thus there is found at the said angle a considerable area of surface extending parallel with the lines of force. Said rings are nested one within another, but are separated so as to form narrow or thin flow spaces or passages between. The superposed or nested rings bearing on the inner walls of the cylindrical partition are prevented from spreading under centrifugal strain by said partition, and the said rings nearly fill the space between the said cylinder and the cream-wall formed in vertical line with the cream-exit $d$. The said rings being V-shaped in cross-section, as indicated in Fig. 1, the narrow passages between said plates are inclined upward and then downward, whereby within a very limited radial distance very long radial flow-spaces will be formed, whereby a long series of such long passages may be formed without unduly extending the length of the bowl. The long flow-spaces give increased opportunity for thorough separation.

I prefer at the apices of the lower conical rings to form outlets $i$ for the blue milk and cream, said openings being staggered vertically to prevent a direct upflow of blue milk toward its final exit.

In constructing the rings $h$ I prefer to make the flanges $h'$ relatively wider than the flanges $h^2$, and the inclinations thereof approach a vertical line more nearly, so that there is a greater creaming-surface near the periphery of the bowl, and near the cream-wall the passages $k\ k\ k$ are shorter in radial distance and wider vertically to permit a freedom of flow to the cream.

The several plates comprising the series are suitably held apart by stops $m$ or projections of any proper character and the said rings are prevented from turning axially by means of ribs or stops $n$ in connection with the feed-tube.

Having thus described the invention, what I claim as new is—

1. The improved cream-separator, herein described comprising a rotary bowl, and a vertical series of angularly-bent plates arranged in said bowl with flow-openings formed therein at or near the angles, substantially as set forth.

2. The improved cream-separator herein described, comprising a rotary bowl and a vertical series of horizontal rings arranged within the bowl, the broad faces of which annular plates are provided with protuberances on one side and corresponding recesses, on the opposite side, said annular plates having flow-openings at or near their points of extreme projection of the protuberances, substantially as set forth.

3. A liner for cream-separators comprising a vertical series of annular angularly-corrugated plates, provided with perforations at or near their apices, substantially as set forth.

4. The combination with a cream-separator bowl, of a series of annularly-corrugated plates, the protuberances of which extend continuously in a direction concentric with the axis of said annular plates, the continuous summits of said protuberances being provided with flow-passages therethrough, substantially as set forth.

5. The improved cream-separator, herein described, comprising a bowl and a series of oppositely-flanged rings nested one within the other and forming oppositely-inclined flow-spaces between, the outer inclined flange-like parts of said rings being wider than the inner inclined flange-like parts, substantially as set forth.

6. The improved cream-separator herein described, comprising a rotary bowl having a central feed-tube, a cylindrical partition, having a collection of perforated protuberances and serving as a bearing for the inclined plates therein and a vertical series of horizontal plates arranged within said cylinder, said plates being correspondingly corrugated and nested and the outside flange-like inclined parts having steeper inclinations and wider extensions than the inside flange-like parts and said outside inclined parts engaging said cylindrical partitions at their outer edges, substantially as set forth.

7. The combination with a cream-separator bowl, of a series of annular plates having vertically-extending protuberances, the sides of which are inclined to the radii of the axis of said annular plates and the summits of which have perforations, and a cylindrical partition, having perforations and inward and outward protuberances bearing oppositely on the inner wall of the bowl and upon the inclined parts of the series of plates to hold the latter in place at the location of greater centrifugal force, substantially as set forth.

In testimony that I claim the foregoing I have hereunto set my hand this 21st day of November, 1900.

OSCAR ANDERSON.

Witnesses:
CHARLES H. PELL,
C. B. PITNEY.